US011252669B2

(12) United States Patent
Annam et al.

(10) Patent No.: US 11,252,669 B2
(45) Date of Patent: Feb. 15, 2022

(54) SELECTIVE EXTENSION OF AN ACTIVE PERIOD OF A DRX CYCLE FOR RESELECTION

(71) Applicant: QUALCOMM Incorporated, San Diego, CA (US)

(72) Inventors: Raevanth Venkat Annam, Hyderabad (IN); Naveen Kumar Pasunooru, Hyderabad (IN); Prashanth Mohan, Chennai (IN); Bhaskara Viswanadham Batchu, Ameenpur Village (IN); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/045,278

(22) Filed: Jul. 25, 2018

(65) Prior Publication Data

US 2020/0037253 A1 Jan. 30, 2020

(51) Int. Cl.
| | |
|---|---|
| *H04W 52/02* | (2009.01) |
| *H04W 76/28* | (2018.01) |
| *H04W 24/10* | (2009.01) |
| *H04W 68/02* | (2009.01) |
| *H04W 36/04* | (2009.01) |

(52) U.S. Cl.
CPC ....... *H04W 52/0245* (2013.01); *H04W 24/10* (2013.01); *H04W 68/02* (2013.01); *H04W 76/28* (2018.02); *H04W 36/04* (2013.01)

(58) Field of Classification Search
None
See application file for complete search history.

(56) References Cited

U.S. PATENT DOCUMENTS

| | | | | |
|---|---|---|---|---|
| 2010/0279679 | A1* | 11/2010 | Young | H04W 36/00835 455/423 |
| 2014/0031027 | A1* | 1/2014 | Dalsgaard | H04W 36/30 455/418 |
| 2014/0036742 | A1* | 2/2014 | Charbit | H04W 52/0235 370/280 |

(Continued)

FOREIGN PATENT DOCUMENTS

EP 1986458 A1 10/2008

OTHER PUBLICATIONS

International Search Report and Written Opinion—PCT/US2019/041544—ISA/EPO—Jan. 15, 2020.

(Continued)

*Primary Examiner* — Sai Aung
*Assistant Examiner* — Liem H. Nguyen
(74) *Attorney, Agent, or Firm* — Harrity & Harrity, LLP/Qualcomm

(57) ABSTRACT

Various aspects of the present disclosure generally relate to wireless communication. In some aspects, a user equipment may determine that a reselection timer has an expiration time that is to extend an active period of a discontinuous reception (DRX) cycle; determine whether to extend the active period based at least in part on at least one of a set of serving cell measurements or a duration that the expiration time is to extend the active period; and selectively extend the active period or enter a sleep mode without extending the active period based at least in part on determining whether to extend the active period. Numerous other aspects are provided.

30 Claims, 8 Drawing Sheets

(56) References Cited

U.S. PATENT DOCUMENTS

| | | | |
|---|---|---|---|
| 2014/0086130 A1* | 3/2014 | Nakamori | H04W 36/0088 370/311 |
| 2015/0264613 A1 | 9/2015 | Gopal et al. | |
| 2017/0251518 A1* | 8/2017 | Agiwal | H04W 24/08 |
| 2018/0049271 A1* | 2/2018 | Bagheri | H04L 27/2601 |
| 2018/0368164 A1* | 12/2018 | Lun | H04W 72/1273 |

OTHER PUBLICATIONS

Nokia, et al., "Clarification of the Correct Behavior when Treselection is not a Multiple of Idle Mode Reselection Evaluation Period", 3GPP Draft; R4-090179, 3rd Generation Partnership Project (3gpp), Mobile Competence centre, 650, Route Des Lucioles, F-06921 Sophia-Antipolis Cedex, France, No. Ljubljana; Jan. 12, 2009, Jan. 12, 2009 (Jan. 12, 2009), XP050326674, 2 Pages, [Retrieved on Jan. 12, 2009], Title, Reason for change, 4.2.2.6 Evaluation of cell reselection criteria.

NTT DOCOMO: "Clarification of Treselection Operation in Cell Reselection Evaluation", 3GPP Draft, 3GPP TSG RAN WG4 Meeting #49, R4-082831, 3rd Generation Partnership Project (3GPP), Mobile Competence Centre, 650, Route Des Lucioles, F-66921 Sophia-Antipolis Cedex, France, No. Prague, Czech Republic, Nov. 5, 2008, Nov. 5, 2008 (Nov. 5, 2008), XP050326065, 1 Page, [retrieved on Nov. 5, 2008] the whole document.

* cited by examiner

SELECTIVE EXTENSION OF AN ACTIVE PERIOD OF A DRX CYCLE FOR RESELECTION

FIELD OF THE DISCLOSURE

Aspects of the present disclosure generally relate to wireless communication, and more particularly to techniques and apparatuses for selective extension of an active period of a discontinuous reception (DRX) cycle for reselection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a reselection timer has an expiration time that is to extend an active period of a discontinuous reception (DRX) cycle; determining whether to extend the active period based at least in part on at least one of a set of serving cell measurements or a duration that the expiration time is to extend the active period; and selectively extending the active period or entering a sleep mode without extending the active period based at least in part on determining whether to extend the active period.

In some aspects, a UE for wireless communication may include memory and one or more processors operatively coupled to the memory. The memory and the one or more processors may be configured to determine that a reselection timer has an expiration time that is to extend an active period of a discontinuous reception (DRX) cycle; determine whether to extend the active period based at least in part on at least one of a set of serving cell measurements or a duration that the expiration time is to extend the active period; and selectively extend the active period or enter a sleep mode without extending the active period based at least in part on determining whether to extend the active period.

In some aspects, a non-transitory computer-readable medium may store one or more instructions for wireless communication. The one or more instructions, when executed by one or more processors of a UE, may cause the one or more processors to determine that a reselection timer has an expiration time that is to extend an active period of a discontinuous reception (DRX) cycle; determine whether to extend the active period based at least in part on at least one of a set of serving cell measurements or a duration that the expiration time is to extend the active period; and selectively extend the active period or enter a sleep mode without extending the active period based at least in part on determining whether to extend the active period.

In some aspects, an apparatus for wireless communication may include means for determining that a reselection timer has an expiration time that is to extend an active period of a discontinuous reception (DRX) cycle; means for determining whether to extend the active period based at least in part on at least one of a set of serving cell measurements or a duration that the expiration time is to extend the active period; and means for selectively extending the active period or entering a sleep mode without extending the active period based at least in part on determining whether to extend the active period.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
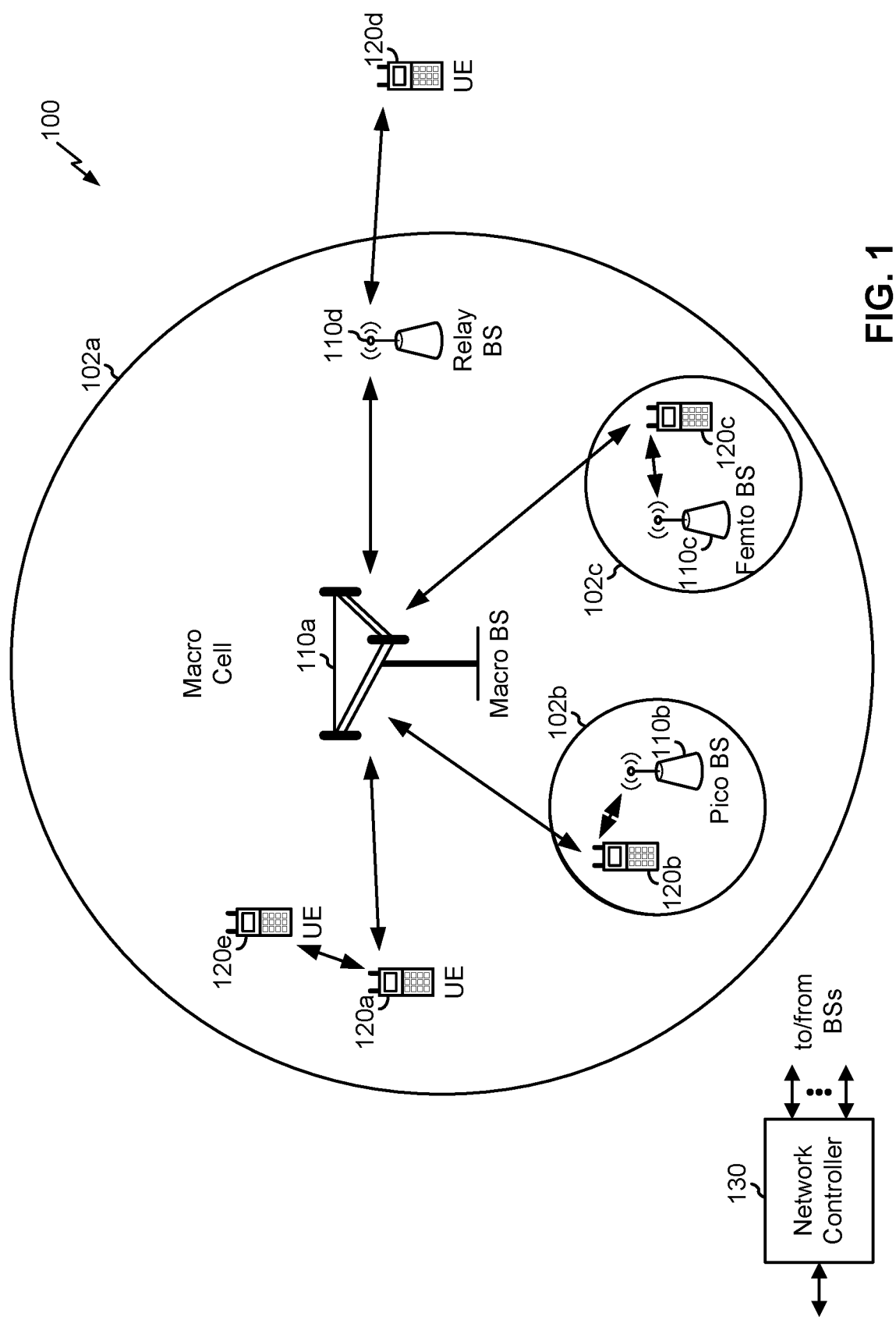
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

A UE 120 may be located within the coverage of multiple BSs 110. One of these BSs 110 may be selected to serve the UE 120. The serving BS 110 may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric.

As indicated above, FIG. 1 is provided merely as an example. Other examples are possible and may differ from what was described with regard to FIG. 1.

Figure 2:
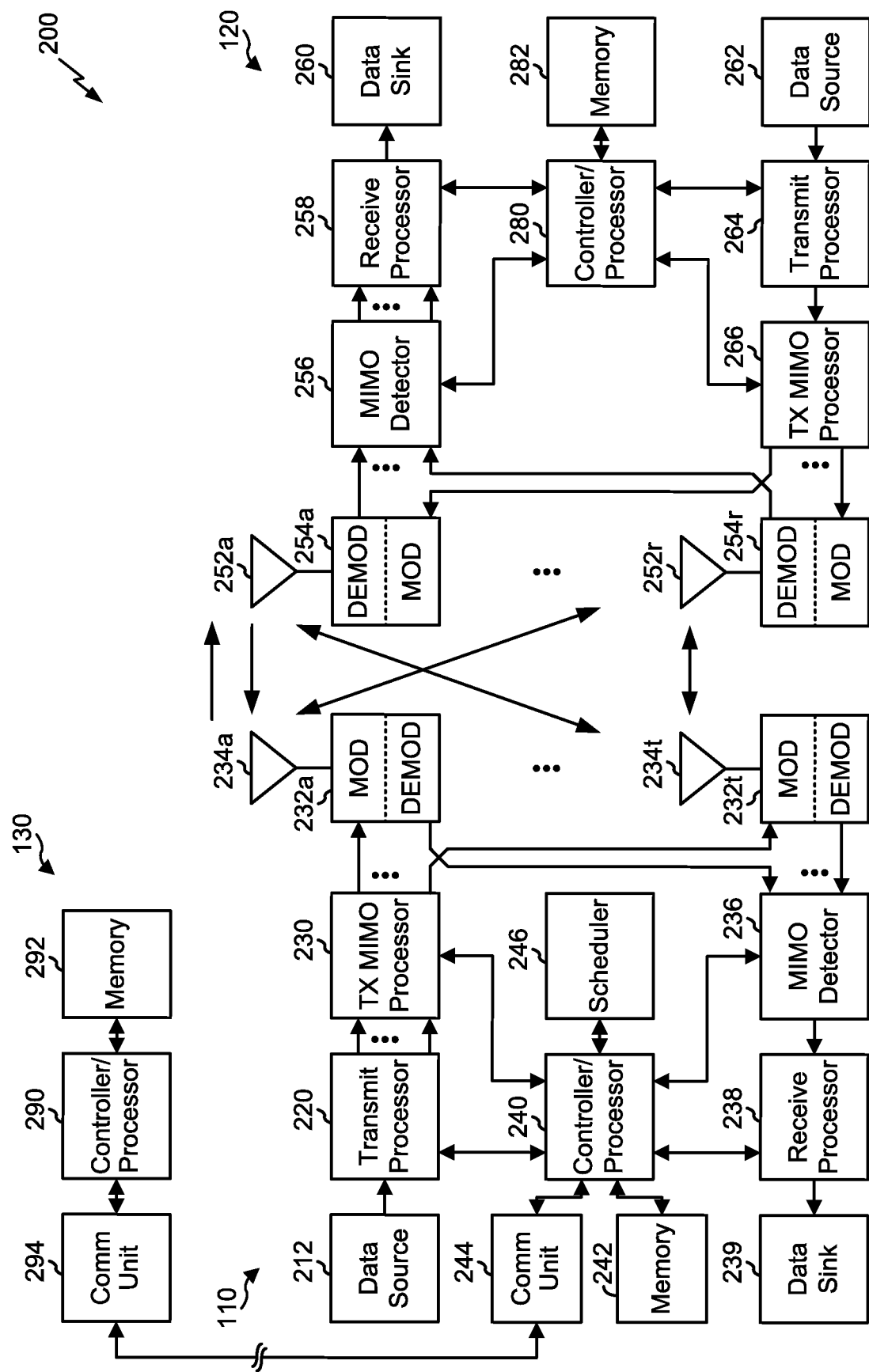
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with selective extension of an active period of a DRX cycle for reselection, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a reselection timer has an expiration time that is to extend an active period of a discontinuous reception (DRX) cycle; means for determining whether to extend the active period based at least in part on at least one of a set of serving cell measurements or a duration that the expiration time is to extend the active period; means for selectively extending the active period or entering a sleep mode without extending the active period based at least in part on determining whether to extend the active period; means for determining that a measurement of a first frequency, corresponding to the first reselection timer, fails to satisfy a criteria; means for triggering reselection for a second frequency, prior to expiration of a second reselection timer corresponding to the second frequency, based at least in part on determining that the measurement of the first frequency fails to satisfy the criteria; means for waking up prior to a scheduled wake-up time associated with a subsequent active period when the sleep mode is entered without extending the active period; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
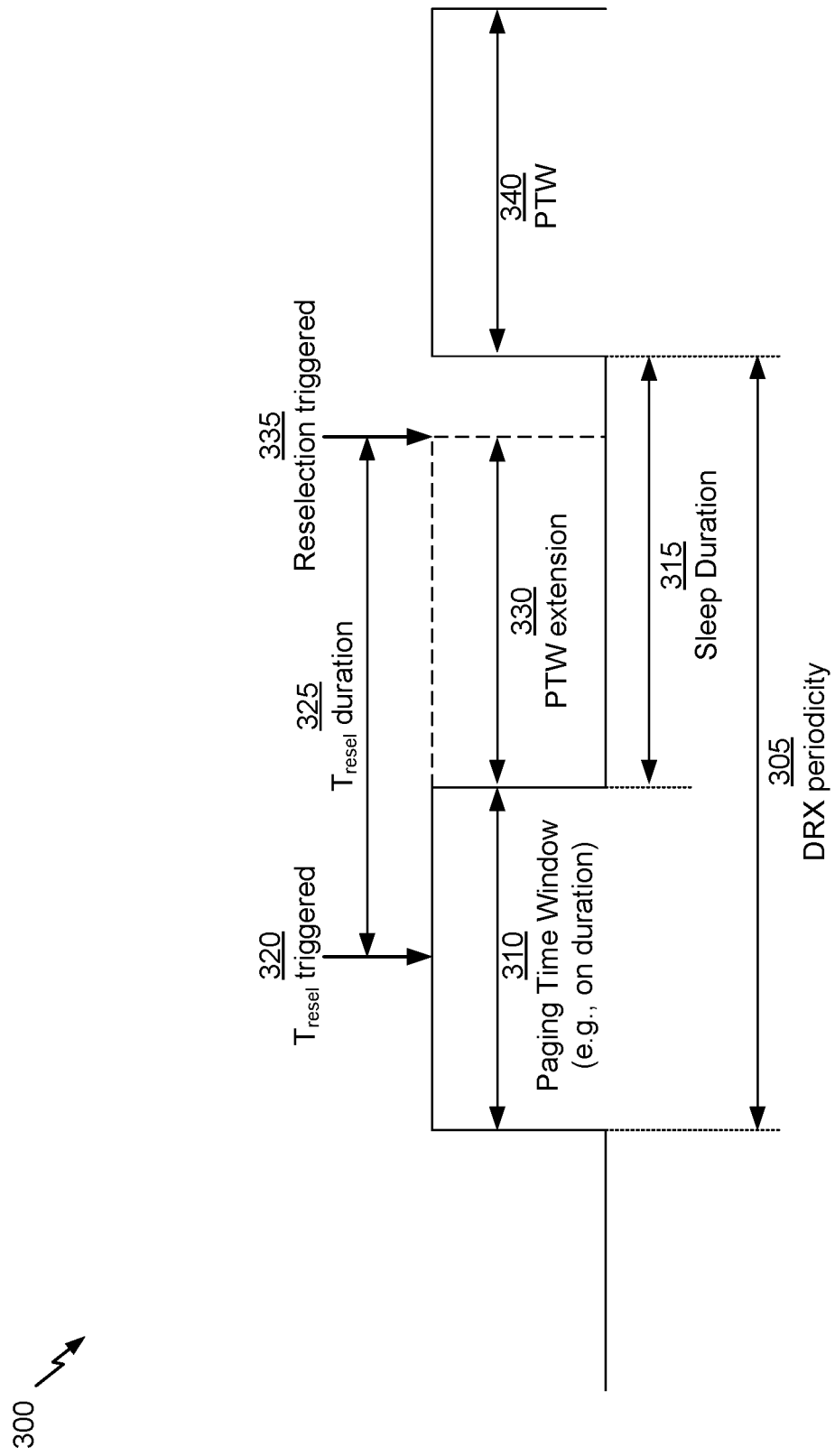
FIGS. 3-4 are diagrams illustrating examples of extending a paging time window for reselection.

FIG. 3 is a diagram illustrating an example 300 of extending a paging time window for reselection.

As shown in FIG. 3, a discontinuous reception (DRX) cycle (e.g., an enhanced DRX (eDRX) cycle and/or the like) configured for a UE 120 may have a DRX periodicity 305 that includes a paging time window (sometimes referred to as PTW) 310 (e.g., an on duration) and a sleep duration 315. During the paging time window 310, the UE 120 may be in an active mode and capable of transmitting and/or receiving communications. During the sleep duration 315, the UE 120 may be in a sleep mode and not capable of transmitting and/or receiving communications. When configured with the DRX cycle, the UE 120 may operate with periods of alternating paging time windows 310 and sleep durations 315 according to the DRX periodicity 305. In this way, the UE 120 may conserve resources, such as battery power and/or the like.

However, as shown by reference number 320, if a reselection timer (shown as $T_{resel}$) is triggered near the end of the paging time window 310 (e.g., due to connectivity issues with a serving cell, detection of a suitable neighbor cell, and/or the like), then the paging time window 310 may be extended, thereby reducing a length of the sleep duration 315 and consuming additional battery power. For example, a reselection timer duration 325 may include a portion that runs for a non-extension duration within the paging time window 310 and an extension duration 330 that extends the paging time window 310 into the sleep duration 315, which causes the UE 120 to remain in the active mode when the UE 120 would otherwise be in the sleep mode if the reselection timer were not running.

A reselection timer may be started (e.g., triggered) based at least in part on occurrence of a reselection triggering event, such as a serving cell parameter (e.g., pathloss and/or the like) failing to satisfy a threshold, a neighbor cell parameter satisfying a threshold, radio link failure on the serving cell, barring of the UE 120 on the serving cell, a neighbor cell rank exceeding a serving cell rank, an instruction from a base station 110 to start the reselection timer, and/or the like. When the reselection timer is started, the UE 120 may perform multiple measurements of one or more neighbor cells, and the length of the reselection timer may define the amount of time that a neighbor cell must meet a cell reselection criteria in order for the UE 120 to reselect to that neighbor cell. For example, if the neighbor cell satisfies the cell reselection criteria for the duration of the reselection timer (e.g., for multiple measurements taken while the reselection timer is running), then the UE 120 may reselect to the neighbor cell upon expiration of the reselection timer. Otherwise, the UE 120 may not reselect to the neighbor cell and may remain camped on the serving cell.

As shown by reference number 335, when the reselection timer expires, reselection may be triggered if a reselection criteria is satisfied during the duration of the reselection timer (e.g., based at least in part on one or more measurements of a neighbor cell taken while the reselection timer is running). The UE 120 may reselect to a neighbor cell if the reselection criteria is satisfied, or may remain camped on the serving cell if the reselection criteria is not satisfied. In either case, the UE 120 may enter sleep mode for the remainder of the sleep duration 315. However, the UE 120 may exit the sleep duration for a next consecutive paging time window 340 according to the DRX periodicity 305. As a result, and due to the extension of the paging time window 310 by the reselection timer, the UE 120 may experience a shorter sleep duration 315, thereby consuming additional battery power.

Some techniques and apparatuses described herein permit selective extension of an active period of a DRX cycle (e.g., including a paging time window and/or the like) for reselection to balance a tradeoff between improved performance due to reselection and conservation of battery power of the UE 120. As described in more detail below (e.g., in connection with FIGS. 5-8), the UE 120 may permit extension of the active period if the extension is short, if a connection with the serving cell is not likely to be maintained beyond the sleep duration, and/or the like. In this way, the UE 120 may improve performance by extending the active period to trigger reselection in some scenarios. As further described in more detail below (e.g., in connection with FIGS. 5-8), the UE 120 may prevent extension of the active period if the extension is long, if a connection with the serving cell is likely to be maintained beyond the sleep duration, and/or the like. In this way, the UE 120 may conserve battery power by preventing extension of the active period in some scenarios.

As indicated above, FIG. 3 is provided as an example. Other examples are possible and may differ from what was described with respect to FIG. 3.

Figure 4:
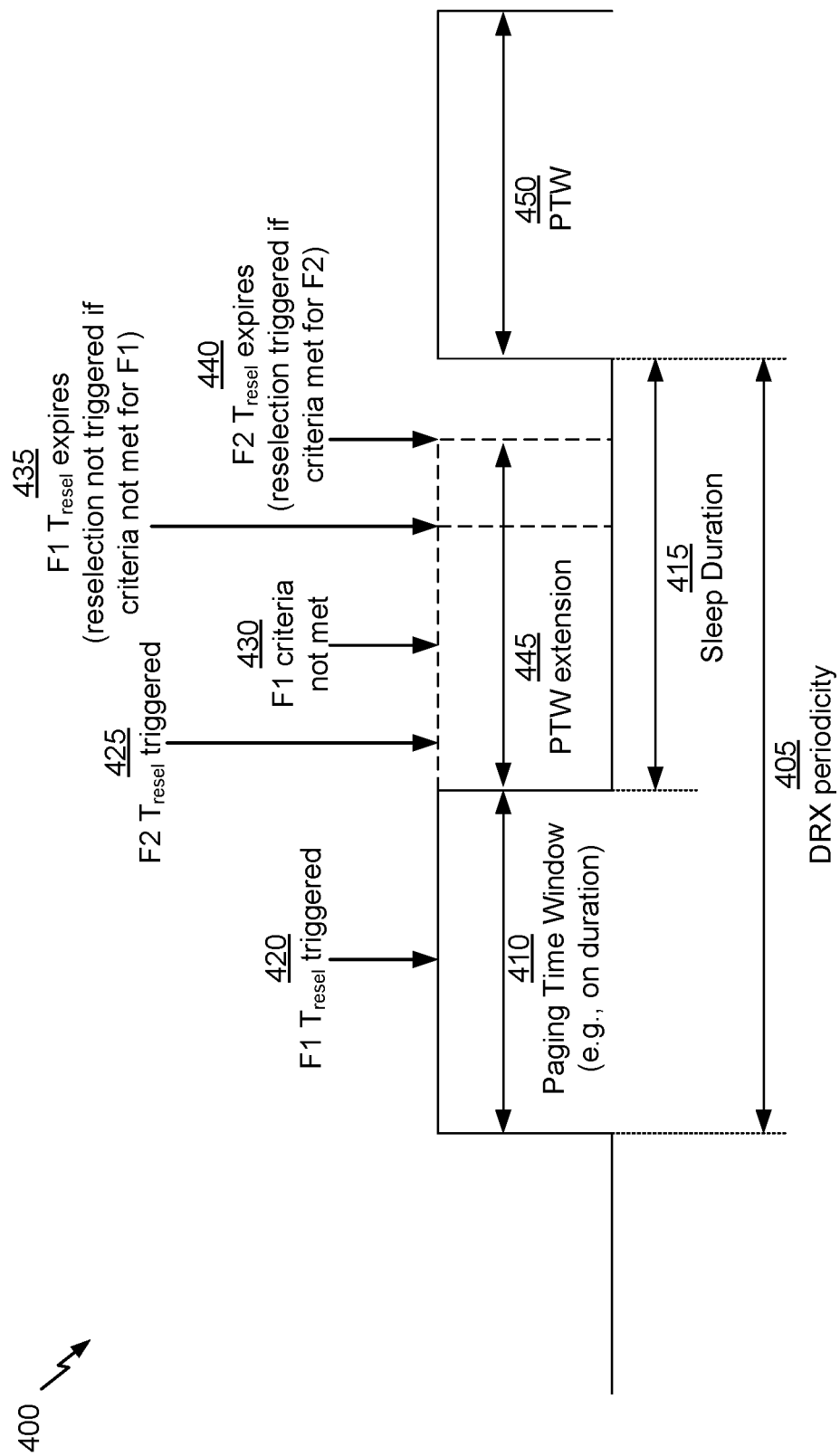

FIG. 4 is a diagram illustrating another example 400 of extending a paging time window for reselection.

As shown in FIG. 4, and as described above in connection with FIG. 3, a DRX cycle configured for a UE 120 may have a DRX periodicity 405 that includes a paging time window 410 and a sleep duration 415. In some cases, the paging time window 410 may be extended by multiple reselection timers corresponding to multiple frequencies to be measured for potential reselection, which may consume even more battery power of the UE 120 than the scenario described above in connection with FIG. 3.

For example, as shown by reference number 420, a first reselection timer for a first frequency (shown as F1) may be triggered near the end of the paging time window 410. As a result, the paging time window 410 may be extended in a similar manner as described above in connection with FIG. 3, thereby reducing a length of the sleep duration 415 and consuming additional battery power. Furthermore, as shown by reference number 425, a second reselection timer for a second frequency (shown as F2) may be triggered after the first reselection timer is triggered and while the first reselection timer is running. Although the second reselection timer is shown as being triggered during an extension of the paging time window 410, in some aspects, the second reselection timer may be triggered prior to the extension of the paging time window 410. Because the second reselection timer is triggered after the first reselection timer, the second reselection timer may extend the paging time window 410 for a longer duration than the first reselection timer, which consumes additional battery power of the UE 120.

For example, as shown by reference number 430, a reselection criteria for reselecting to the first frequency may not be satisfied during the duration of the first reselection timer. Thus, as shown by reference number 435, reselection to the first frequency may not be triggered when the first reselection timer expires. However, the UE 120 may not enter a sleep mode at that time because the second reselection timer is still running. As shown by reference number 440, when the second reselection timer expires, reselection to the second frequency may be triggered if a reselection criteria for reselecting to the second frequency is satisfied. The UE 120 may reselect to the second frequency (e.g., a neighbor cell having the second frequency as a center frequency) if the reselection criteria is satisfied, or may remain camped on the serving cell if the reselection criteria is not satisfied. In either case, the UE 120 may enter a sleep mode for the remainder of the sleep duration 415.

However, due to the multiple reselection timers, the paging time window extension 445 may have a longer duration than when a single reselection timer is running (e.g., as described above in connection with FIG. 3). In some cases, one or more additional reselection timers may be triggered, or the second reselection timer may be triggered later in time, which may entirely prevent the UE 120 from entering a sleep mode due to extension of the paging time window 410 to a next consecutive paging time window 450. This may unnecessarily consume battery power of the UE 120.

As indicated above in connection with FIG. 3, some techniques and apparatuses described herein permit selective extension of an active period of a DRX cycle (e.g., including a paging time window and/or the like) for reselection to balance a tradeoff between improved performance due to reselection and conservation of battery power of the UE 120. Furthermore, some techniques and apparatuses described herein limit a length of the extension of the active period (e.g., when multiple reselection timers are triggered), thereby conserving battery power of the UE 120. Additional details are described below in connection with FIGS. 5-8.

As indicated above, FIG. 4 is provided as an example. Other examples are possible and may differ from what was described with respect to FIG. 4.

Figure 5:
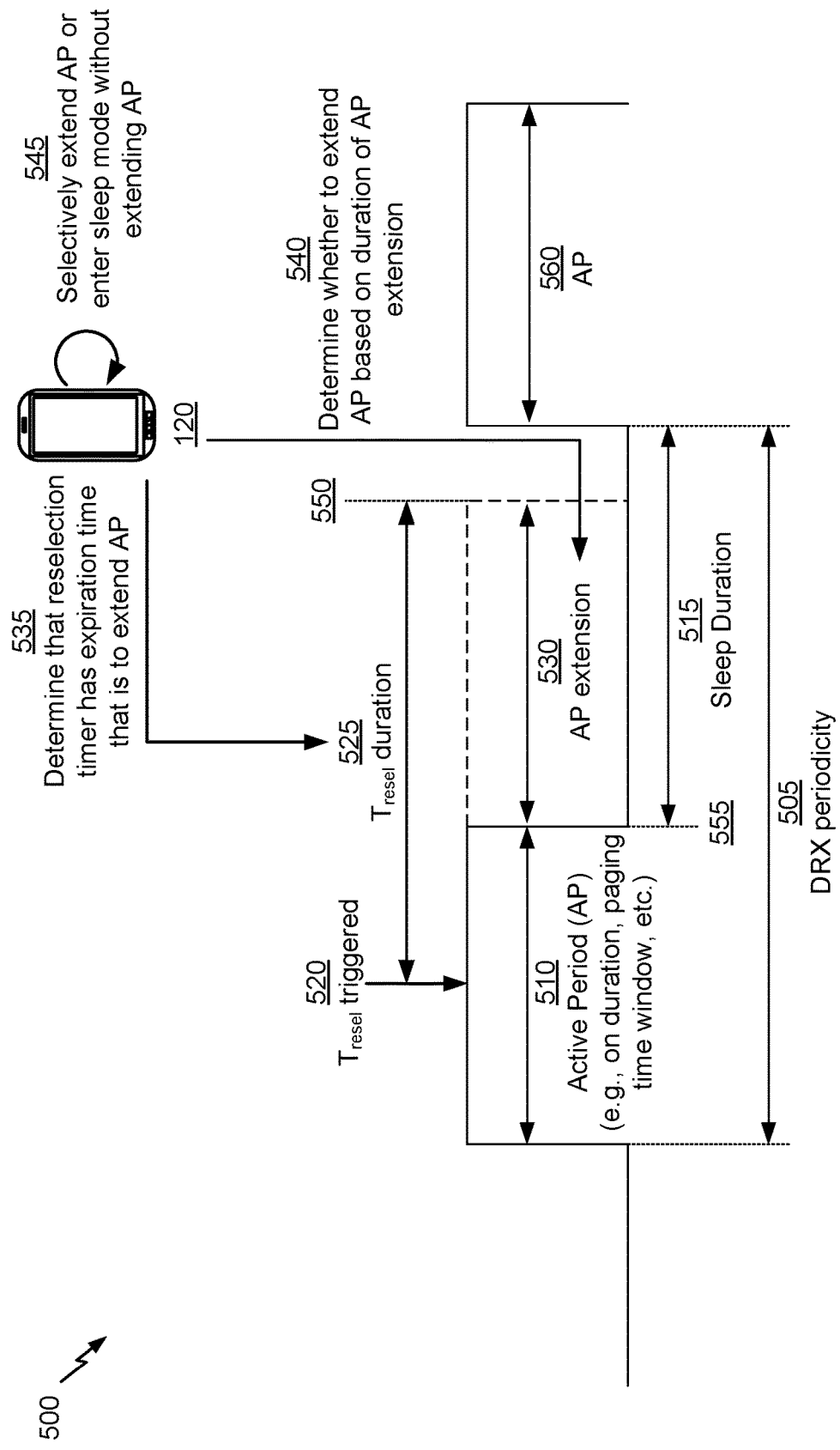
FIGS. 5-7 are diagrams illustrating examples of selective extension of an active period of a DRX cycle for reselection, in accordance with various aspects of the present disclosure.

FIG. 5 is a diagram illustrating an example 500 of selective extension of an active period of a DRX cycle for reselection, in accordance with various aspects of the present disclosure.

As shown in FIG. 5, a DRX cycle (e.g., an eDRX cycle and/or the like) configured for a UE 120 may have a DRX periodicity 505 that includes an active period 510 (e.g., an on duration, a paging time window, and/or the like) and a sleep duration 515. During the active period 510, the UE 120 may be in an active mode and capable of transmitting and/or receiving communications. During the sleep duration 515, the UE 120 may be in a sleep mode and not capable of transmitting and/or receiving communications. When configured with the DRX cycle, the UE 120 may operate with periods of alternating active periods 510 and sleep durations 515 according to the DRX periodicity 505.

As shown by reference number 520, a reselection timer (shown as $T_{resel}$) may be triggered near the end of the active period 510 (e.g., due to connectivity issues with a serving cell, detection of a suitable neighbor cell, detection of a suitable neighbor cell frequency, and/or the like). For example, the reselection timer may be triggered at a time that is within a threshold amount of time (e.g., less than the duration of the reselection timer) from the scheduled end of the active period 510. As described above in connection with FIGS. 3 and 4, the reselection timer may have a reselection timer duration 525 that causes extension of the active period for an active period (AP) extension duration 530, thereby reducing a length of the sleep duration 515 and consuming additional battery power of the UE 120.

As shown by reference number 535, the UE 120 may determine that the reselection timer has an expiration time that is to extend the active period 510. For example, the UE 120 may determine a non-extension duration of the reselection timer as a length of time between triggering of the reselection timer and a scheduled end of the active period 510 (e.g., a configured length of a DRX on duration). If the reselection timer has a reselection timer duration 525 that is greater than the non-extension time, then the UE 120 may determine that the reselection timer has an expiration time that is to extend the active period 510. Additionally, or alternatively, the UE 120 may determine that the reselection timer is triggered within a threshold amount of time from a scheduled end of the active period. In some aspects, the threshold amount of time may be less than the reselection timer duration 525.

As shown by reference number 540, the UE 120 may determine whether to extend the active period 510 based at least in part on a duration that the expiration time is to extend the active period 510. For example, the UE 120 may determine whether to extend the active period 510 based at least in part on the AP extension duration 530, as described in more detail below. Additionally, or alternatively, the UE 120 may determine whether to extend the active period 510 based at least in part on a set of serving cell measurements, as described in more detail below. For example, the UE 120 may determine whether to extend the active period 510 based at least in part on whether the set of serving cell measurements indicate a decrease in signal strength of a serving cell over time, a rate at which the signal strength of the serving cell is decreasing over time, and/or the like.

As shown by reference number 545, the UE 120 may selectively extend (e.g., may extend or not extend) the active period 510 based at least in part on the determination of whether to extend the active period 510. For example, the UE 120 may extend the active period 510 if a condition is satisfied, or may enter a sleep mode without extending the active period 510 if the condition is not satisfied. If the UE 120 extends the active period 510, then the UE 120 may enter a sleep mode for the remainder of the sleep duration 515 at a time indicated by reference number 550 (e.g., when the reselection timer expires). If the UE 120 enters the sleep mode without extending the active period 510, then the UE 120 may enter the sleep mode at a time indicated by reference number 555 (e.g., at the scheduled end of the active period 510).

In some aspects, if the UE 120 determines not to extend the active period 510 (e.g., because the condition is not satisfied), then the UE 120 may ignore the reselection timer and/or prevent performance of one or more operations that would otherwise be triggered by the reselection timer (e.g., may not track time associated with the reselection timer, may not make measurements associated with the reselection timer, may not determine whether measurements satisfy reselection criteria, and/or the like), thereby conserving UE resources (e.g., memory, processing power, battery power, and/or the like).

In some aspects, if the AP extension duration 530 satisfies a threshold (e.g., is greater than or equal to the threshold), then the UE 120 may enter the sleep mode without extending the active period 510, thereby conserving a relatively large amount of battery power that would otherwise be consumed by a relatively long extension of the active period 510. Additionally, or alternatively, if the AP extension duration 530 does not satisfy a threshold (e.g., is less than or equal to the threshold), then the UE 120 may extend the active period 510, thereby improving performance by performing a reselection procedure when a relatively small amount of battery power will be consumed by a relatively short extension of the active period 510.

In some aspects, the UE 120 may determine the threshold based at least in part on the sleep duration 515 (e.g., the length of the sleep duration 515), the DRX periodicity 505 (e.g., the length of the DRX periodicity 505), and/or the like. For example, the UE 120 may compare the length of the AP extension duration 530 and the length of the sleep duration 515 to determine whether to extend the active period 510. For example, if a difference between the sleep duration 515 (e.g., T1) and the AP extension duration 530 (e.g., T2) is less than (or equal to) a threshold (e.g., T1−T2≤threshold), then the UE 120 may extend the active period 510. Otherwise, if the difference is greater than (or equal to) a threshold, then the UE 120 may enter a sleep mode without extending the active period 510. As another example, the UE 120 may apply a fractional weight factor (e.g., K, which may be set to, for example, ½, ⅓, ¼, and/or the like) to T1, and may extend the active period 510 if T2 is less than (or equal to) K×T1. Otherwise, the UE 120 may enter the sleep mode without extending the active period 510 if T2 is greater than (or equal to) K×T1. In this way, the active period 510 may be extended for a relatively short amount of time, whereas such extension may be prevented if the extension would be for a relatively long amount of time. In some aspects, the UE 120 may determine the fractional weight factor based at least in part on a power savings estimation.

Additionally, or alternatively, the UE 120 may selectively extend the active period 510 based at least in part on a set of serving cell measurements (e.g., a most recent set of serving cell measurements, such as 3 measurements, 4 measurements, and/or the like). For example, if the set of serving cell measurements indicate a decrease in signal strength of the serving cell over time (e.g., a decrease in signal strength by an amount that satisfies a threshold), then the UE 120 may extend the active period 510. In this way, reselection to a neighbor cell may be performed when conditions of the serving cell are worsening, thereby improving performance. Additionally, or alternatively, if the set of serving cell measurements do not indicate a decrease in signal strength of the serving cell over time (e.g., indicate an increase or no change), then the UE 120 may enter the sleep mode at the scheduled end of the active period 510 without extending the active period 510. In this case, the serving cell is less likely to be unsuitable for communication or connection at the end of the sleep duration 515, and the UE 120 will likely be able to reconnect to the serving cell. Thus, battery power of the UE 120 may be conserved without hampering performance (e.g., because reselection is unnecessary).

Additionally, or alternatively, the UE 120 may selectively extend the active period 510 based at least in part on a rate at which the signal strength of the serving cell is decreasing over time. For example, if the rate satisfies a threshold (e.g., is greater than or equal to the threshold), then the UE 120 may extend the active period 510. Additionally, or alternatively, the UE 120 may selectively extend the active period 510 based at least in part on the rate and a length of the sleep duration 515 (and/or the DRX periodicity 505). For example, the UE 120 may determine, based at least in part on the rate and the length of the sleep duration 515, whether the serving cell will be suitable for a connection at the end of the sleep duration 515.

In this way, reselection to a neighbor cell may be performed when conditions of the serving cell are worsening at a rate that makes it unlikely that the serving cell will be suitable for a connection at the end of the sleep duration 515, thereby improving performance. Additionally, or alternatively, if the rate does not satisfy a threshold (e.g., is less than or equal to the threshold), then the UE 120 may enter the sleep mode at the scheduled end of the active period 510 without extending the active period 510. In this case, the serving cell is less likely to be unsuitable for communication or connection at the end of the sleep duration 515, and the UE 120 will likely be able to reconnect to the serving cell.

Thus, battery power of the UE 120 may be conserved without hampering performance (e.g., because reselection is unnecessary).

Although some techniques and apparatuses are described herein in connection with measuring a signal strength of the serving cell, in some aspects, another parameter may be used. For example, the signal strength or other parameter may be represented by a reference signal received power (RSRP) parameter, a reference signal received quality (RSRQ) parameter, a received signal strength indicator (RSSI) parameter, a signal to interference plus noise ratio (SINR) parameter, and/or the like.

In some aspects, if the UE 120 enters the sleep mode without extending the active period 510, then the UE 120 may wake up prior to a scheduled wake-up time associated with a subsequent active period 560 (e.g., the next consecutive active period). In some aspects, the UE 120 may determine whether the serving cell is suitable during this early wake-up period. If the serving cell is not suitable (e.g., the serving cell fails a criteria), then the UE 120 may trigger a reselection procedure (e.g., to perform one or more measurements for reselection to a neighbor cell, to reselect to a neighbor cell, and/or the like) during the early wake-up period. For example, the UE 120 may perform the reselection procedure in association with a neighbor cell corresponding to the reselection timer that was triggered during the prior active period 510. In some aspects, the duration of the early wake-up period may be less than the AP extension duration 530 to conserve battery power of the UE 120.

As described elsewhere herein, if the UE 120 extends the active period 510, reselection may be triggered when the reselection time expires (e.g., at a time indicated by reference number 550) if a reselection criteria is satisfied. The UE 120 may reselect to a neighbor cell if the reselection criteria is satisfied, or may remain camped on the serving cell if the reselection criteria is not satisfied. In either case, the UE 120 may enter sleep mode for the remainder of the sleep duration 515.

As indicated above, FIG. 5 is provided as an example. Other examples are possible and may differ from what was described with respect to FIG. 5.

Figure 6:
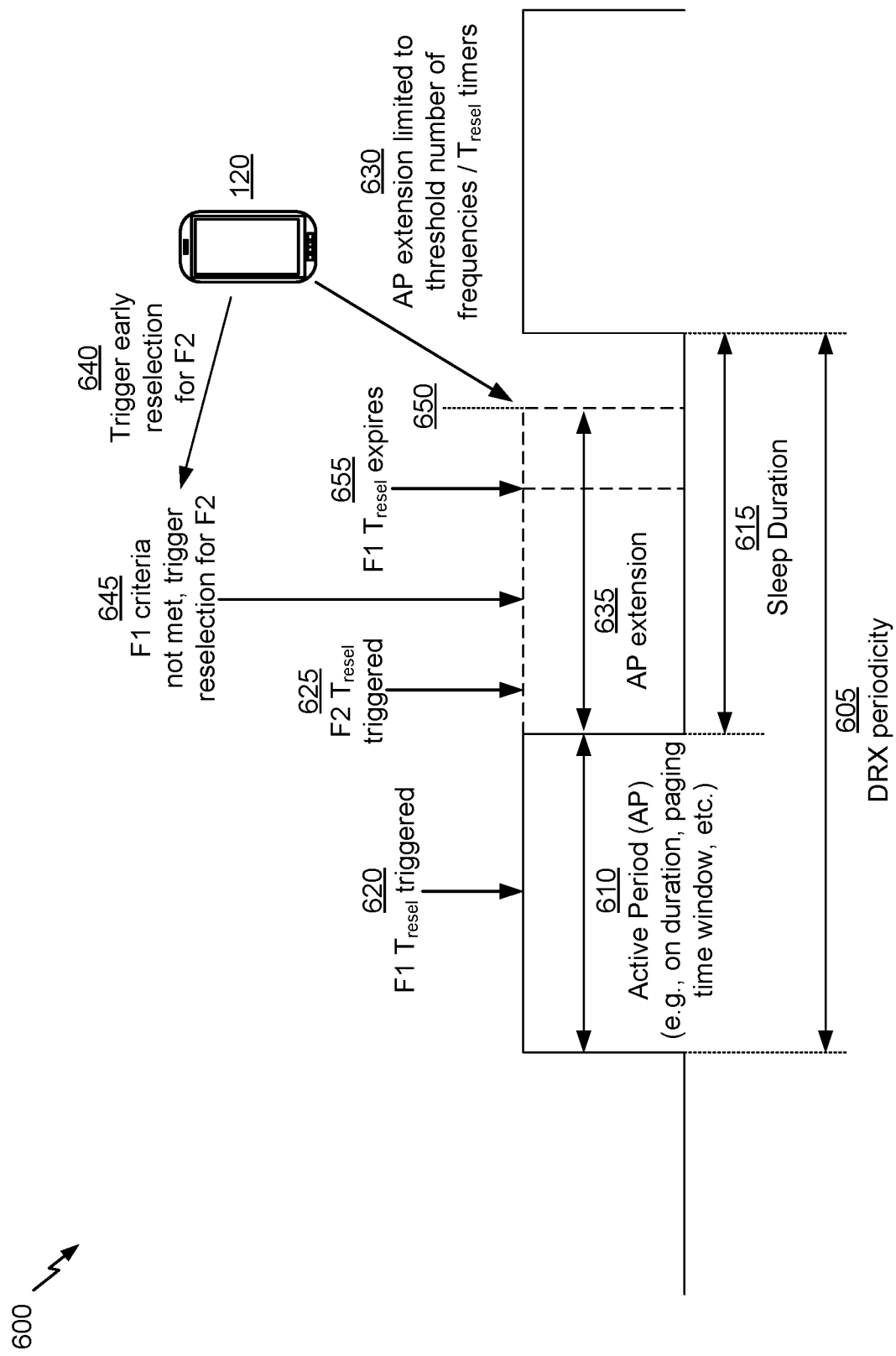

FIG. 6 is a diagram illustrating another example 600 of selective extension of an active period of a DRX cycle for reselection, in accordance with various aspects of the present disclosure.

As shown in FIG. 6, and as described above in connection with FIG. 5, a DRX cycle configured for a UE 120 may have a DRX periodicity 605 that includes an active period 610 (e.g., an on duration, a paging time window, and/or the like) and a sleep duration 615.

As shown by reference number 620, a first reselection timer for a first frequency (shown as F1) may be triggered near the end of the active period 610. For example, the first reselection timer may be triggered at a time that is within a threshold amount of time (e.g., less than the duration of the first reselection timer) from the scheduled end of the active period 610. As described above in connection with FIGS. 3 and 4, the first reselection timer may have a duration that causes extension of the active period 610, thereby reducing a length of the sleep duration 615 and consuming battery power of the UE 120.

Furthermore, as shown by reference number 625, a second reselection timer for a second frequency (shown as F2) may be triggered after the first reselection timer is triggered and/or while the first reselection timer is running. Although the second reselection timer is shown as being triggered during an extension of the active period 610, in some aspects, the second reselection timer may be triggered prior to the extension of the active period 610 (e.g., within a threshold amount of time from the scheduled end of the active period 610, as described above). Because the second reselection timer is triggered after the first reselection timer, the second reselection timer may extend the active period 610 for a longer duration than the first reselection timer, thereby further reducing a length of the sleep duration 615 and consuming additional battery power of the UE 120.

In some aspects, the UE 120 may apply the techniques described above in connection with FIG. 5 to determine whether to extend the active period 610 for one or more reselection timers corresponding to one or more frequencies, and/or to selectively extend the active period 610 for the one or more reselection timers. For example, the UE 120 may determine to extend the active period 610 for the first reselection timer, the second reselection timer, and so on. As another example, the UE 120 may determine to enter a sleep mode at the end of the active period 610 without extending the active period 610 for the first reselection timer, the second reselection timer, and so on. As another example, the UE 120 may extend the active period 610 for the first reselection timer, but may enter the sleep mode after expiration of the first reselection timer without further extension of the active period 610 for the second reselection timer. When multiple reselection timers are running (e.g., corresponding to multiple frequencies), then the UE 120 may determine whether to extend the active period 610 for each of the individual reselection timers in a similar manner as described above in connection with FIG. 5.

Additionally, or alternatively, and as shown by reference number 630, the UE 120 may limit a number of reselection timers and/or frequencies for which the active period 610 is permitted to be extended. For example, the UE 120 may be configured with a threshold number (e.g., two, three, four, and/or the like) of reselection timers for which the active period 610 is permitted to be extended. In this case, the threshold number of reselection timers may correspond to a threshold number of frequencies to be prioritized for reselection. In this way, a length of the active period extension 635 may be reduced as compared to permitting an unlimited number of reselection timers to extend the active period 610, thereby permitting reselection while also conserving battery power of the UE 120.

Additionally, or alternatively, the UE 120 may trigger early reselection for a later-occurring reselection timer, as shown by reference number 640. Early reselection may refer to triggering reselection prior to expiration of a reselection timer. For example, in FIG. 6, the UE 120 triggers early reselection for F2 by triggering reselection at 645 (e.g., when a reselection criteria for F1 is not satisfied) rather than at 650 (e.g., when the reselection timer for F2 would expire). In some aspects, the early reselection may be triggered based at least in part on a determination that a reselection criteria associated with an earlier-occurring reselection timer is not satisfied.

For example, as shown by reference number 645, a reselection criteria for reselecting to the first frequency may not be satisfied during the duration of the first reselection timer. This may occur, for example, when a measurement of the first frequency, corresponding to the first reselection timer, fails to satisfy a criteria (e.g., a reselection criteria). In this case, rather than waiting for the second reselection timer to expire to trigger reselection for the second frequency (e.g., which would occur at a time indicated by reference number 650), the UE 120 may trigger early reselection for the second frequency at a time indicated by reference number 645 (e.g., rather than at a time indicated by reference number 650, corresponding to an expiration of a reselection timer for the second frequency). In this case, if a measurement of the second frequency satisfies a reselection criteria, then the UE 120 may reselect to the second frequency, and may then enter a sleep state, thus reducing the length of the AP extension 635 and conserving battery power of the UE 120.

In some aspects, if the reselection criteria is not satisfied for the second frequency, then the UE 120 may configure the second reselection timer to expire at the expiration time of the first reselection timer, as shown by reference number 655. Thus, the UE 120 may prevent the second reselection timer from extending the active period 610 past an expiration time associated with the first reselection timer, thus reducing the length of the AP extension 635 and conserving battery power of the UE 120.

As indicated above, FIG. 6 is provided as an example. Other examples are possible and may differ from what was described with respect to FIG. 6.

Figure 7:
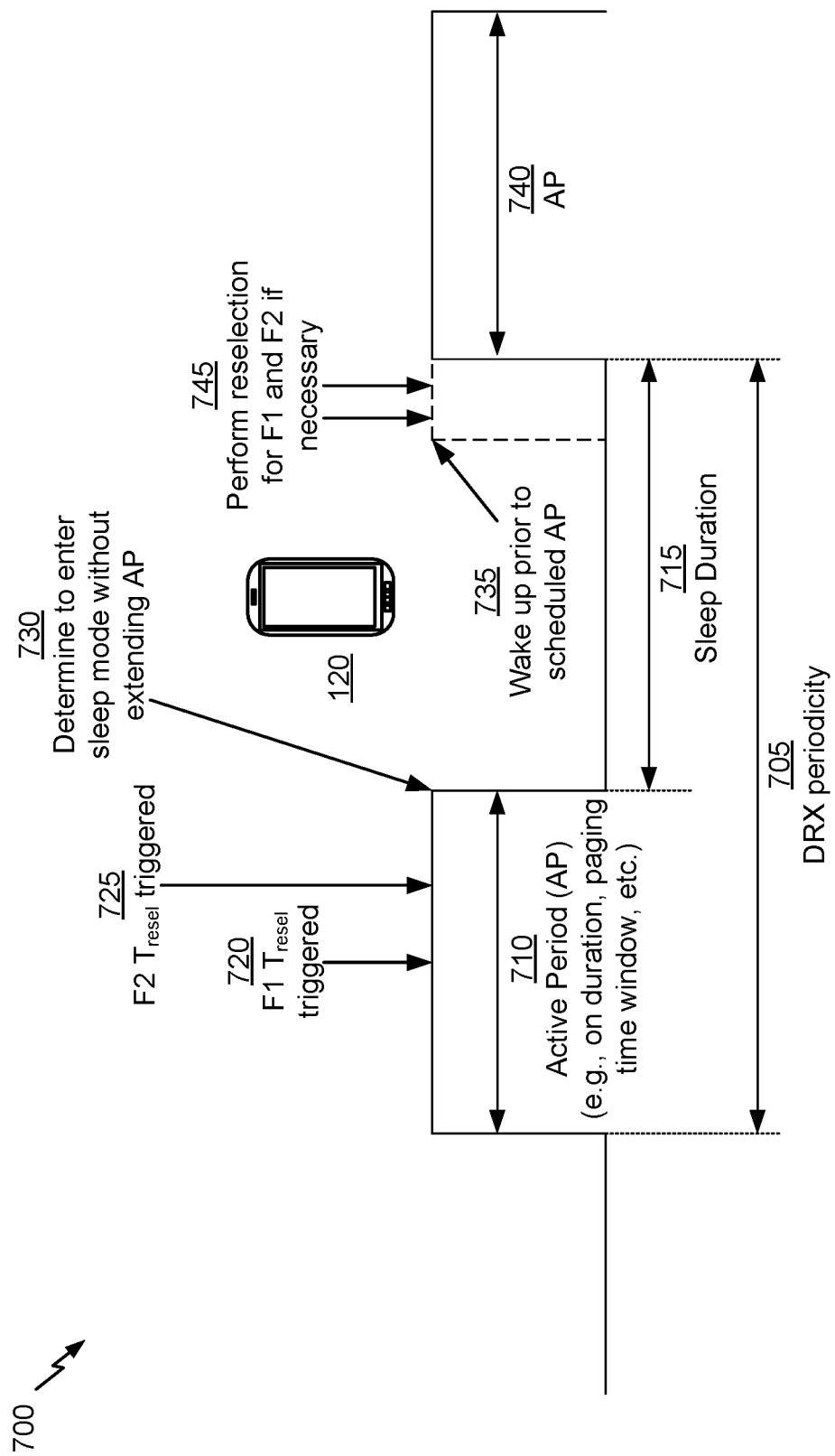

FIG. 7 is a diagram illustrating another example 700 of selective extension of an active period of a DRX cycle for reselection, in accordance with various aspects of the present disclosure.

As shown in FIG. 7, and as described elsewhere herein, a DRX cycle configured for a UE 120 may have a DRX periodicity 705 that includes an active period 710 (e.g., an on duration, a paging time window, and/or the like) and a sleep duration 715. As shown by reference number 720, a first reselection timer for a first frequency (shown as F1) may be triggered near the end of the active period 710. For example, the first reselection timer may be triggered at a time that is within a threshold amount of time (e.g., less than the duration of the first reselection timer) from the scheduled end of the active period 710, as described elsewhere herein. As further described elsewhere herein, the first reselection timer may have a duration that causes extension of the active period 710, thereby reducing a length of the sleep duration 715 and consuming battery power of the UE 120.

As shown by reference number 725, a second reselection timer for a second frequency (shown as F2) may be triggered after the first reselection timer is triggered and/or while the first reselection timer is running, as described elsewhere herein. Because the second reselection timer is triggered after the first reselection timer, the second reselection timer may extend the active period 710 for a longer duration than the first reselection timer, thereby further reducing a length of the sleep duration 715 and consuming additional battery power of the UE 120.

In some aspects, the UE 120 may apply the techniques described above in connection with FIG. 5 and/or FIG. 6 to determine whether to extend the active period 710 for one or more reselection timers corresponding to one or more frequencies, and/or to selectively extend the active period 710 for the one or more reselection timers.

As shown by reference number 730, in some aspects, the UE 120 may determine to enter a sleep mode without extending the active period 710. In this case, and as shown by reference number 735, the UE 120 may wake up prior to a scheduled wake-up time associated with a subsequent active period 740 (e.g., when the sleep mode is entered without extending the active period 710). In some aspects, the UE 120 may determine whether the serving cell is suitable during this early wake-up period. If the serving cell is not suitable (e.g., the serving cell fails a criteria), then the UE 120 may trigger a reselection procedure (e.g., to perform one or more measurements for reselection to a neighbor cell, to reselect to a neighbor cell, and/or the like) during the early wake-up period.

For example, as shown by reference number 745, the UE 120 may perform the reselection procedure in association with one or more frequencies corresponding to one or more reselection timers that were triggered during the prior active period 710 and for which the UE 120 determined not to extend the active period 710 (e.g., one or more reselection timers that were running when the UE 120 entered the sleep mode). In some aspects, the duration of the early wake-up period may be less than an amount of time that the reselection timer(s) would have extended the active period 710, thereby conserving battery power of the UE 120. In this way, the UE 120 may improve performance by wake up early to perform reselection in association with one or more reselection timers that were running when the UE 120 entered the sleep mode.

As indicated above, FIG. 7 is provided as an example. Other examples are possible and may differ from what was described with respect to FIG. 7.

Figure 8:
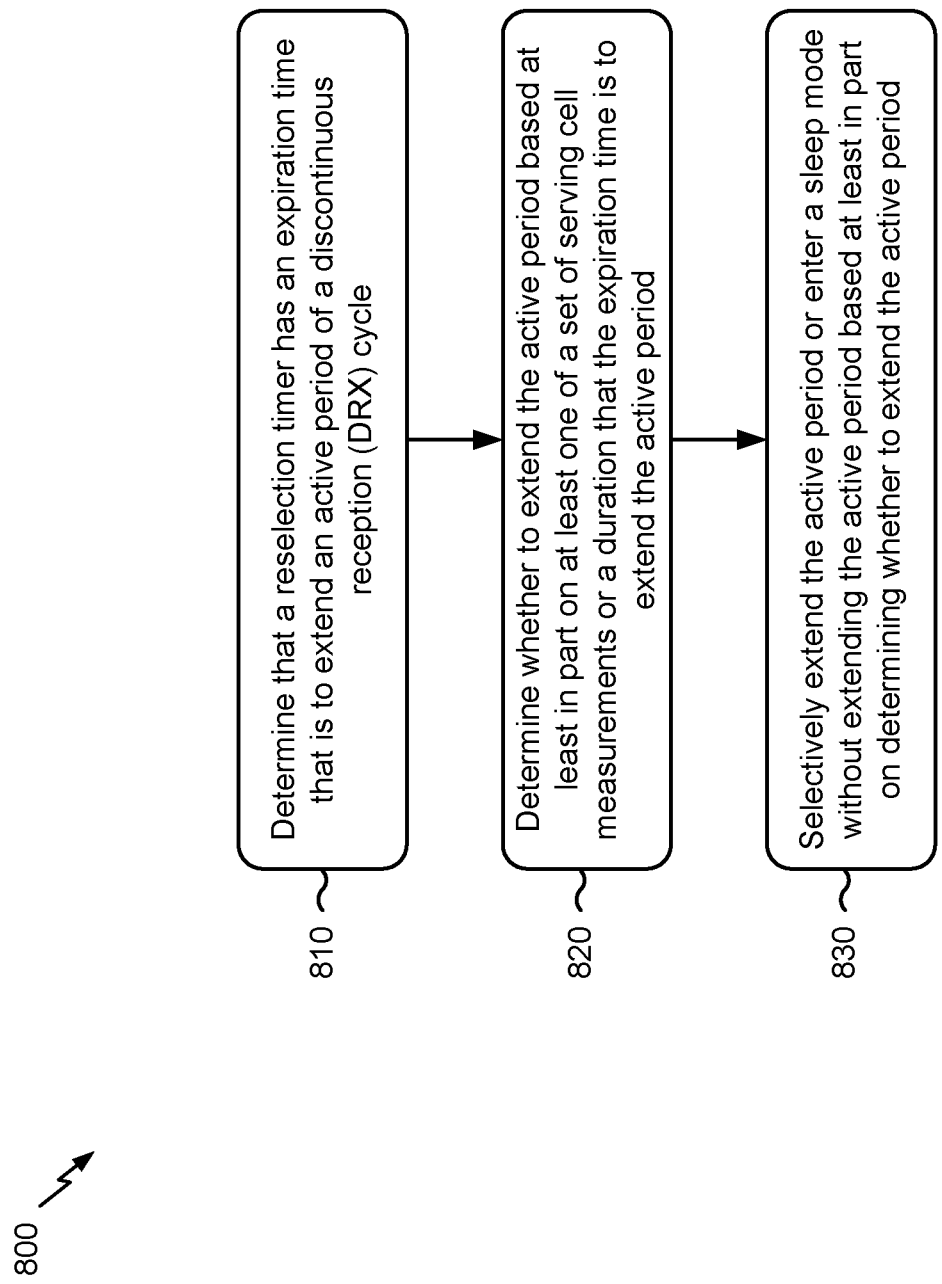
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with selective extension of an active period of a DRX cycle for reselection.

As shown in FIG. 8, in some aspects, process 800 may include determining that a reselection timer has an expiration time that is to extend an active period of a discontinuous reception (DRX) cycle (block 810). For example, the UE (e.g., using controller/processor 280 and/or the like) may determine that a reselection timer has an expiration time that is to extend an active period of a discontinuous reception (DRX) cycle, as described above in connection with FIGS. 5-7.

As further shown in FIG. 8, in some aspects, process 800 may include determining whether to extend the active period based at least in part on at least one of a set of serving cell measurements or a duration that the expiration time is to extend the active period (block 820). For example, the UE (e.g., using controller/processor 280 and/or the like) may determine whether to extend the active period based at least in part on at least one of a set of serving cell measurements or a duration that the expiration time is to extend the active period, as described above in connection with FIGS. 5-7.

As further shown in FIG. 8, in some aspects, process 800 may include selectively extending the active period or entering a sleep mode without extending the active period based at least in part on determining whether to extend the active period (block 830). For example, the UE (e.g., using controller/processor 280 and/or the like) may selectively extend the active period or enter a sleep mode without extending the active period based at least in part on determining whether to extend the active period, as described above in connection with FIGS. 5-7.

Process 800 may include additional aspects, such as any single aspect or any combination of aspects described below and/or in connection with one or more other processes described elsewhere herein.

In some aspects, the determination of whether to extend the active period is based at least in part on the set of serving cell measurements and the duration that the expiration time is to extend the active period. In some aspects, the determination of whether to extend the active period is based at least in part on at least one of: whether the set of serving cell measurements indicate a decrease in signal strength of a serving cell over time, a rate at which the signal strength of the serving cell is decreasing over time, or a combination thereof.

In some aspects, the sleep mode is entered without extending the active period when the duration satisfies a threshold, or wherein the active period is extended when the duration does not satisfy the threshold. In some aspects, the threshold is determined based at least in part on at least one of a sleep duration of a discontinuous reception (DRX) cycle of the UE or a periodicity of the DRX cycle.

In some aspects, the active period is extended for no more than a threshold number of reselection timers corresponding to a threshold number of frequencies to be prioritized for reselection. In some aspects, the reselection timer is a first reselection timer, and the UE may determine that a measurement of a first frequency, corresponding to the first reselection timer, fails to satisfy a criteria; and trigger reselection for a second frequency, prior to expiration of a second reselection timer corresponding to the second frequency, based at least in part on determining that the measurement of the first frequency fails to satisfy the criteria. In some aspects, the second reselection timer is configured to expire at the expiration time of the first reselection timer.

In some aspects, the UE may wake up prior to a scheduled wake-up time associated with a subsequent active period when the sleep mode is entered without extending the active period. In some aspects, reselection is performed for one or more frequencies, for which a corresponding reselection timer was running when the sleep mode was entered, based at least in part on a determination that a serving cell frequency fails to satisfy a criteria.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a reselection timer has an expiration time that is to extend an active period of a discontinuous reception (DRX) cycle;
   determining, when the reselection timer has the expiration time that is to extend the active period, whether to extend the active period based at least in part on a rate at which signal strength of a serving cell is decreasing over time;
   extending the active period if it is determined to extend the active period; and
   entering a sleep mode without extending the active period if it is determined to not extend the active period.

2. The method of claim 1, wherein whether to extend the active period is determined further based on a set of serving cell measurements and a duration that the expiration time is to extend the active period.

3. The method of claim 1, wherein whether to extend the active period is determined further based whether a set of serving cell measurements indicate a decrease in the signal strength of the serving cell over the time.

4. The method of claim 1, wherein the sleep mode is entered without extending the active period based on a duration that the expiration time is to extend the active period satisfying a threshold.

5. The method of claim 4, wherein the threshold is determined based at least in part on at least one of a sleep duration of a discontinuous reception (DRX) cycle of the UE or a periodicity of the DRX cycle.

6. The method of claim 1, wherein the reselection timer is a first reselection timer, and wherein the method further comprises:
   determining that a measurement of a first frequency, corresponding to the first reselection timer, fails to satisfy a criteria; and triggering reselection for a second frequency, prior to expiration of a second reselection timer corresponding to the second frequency, based at least in part on determining that the measurement of the first frequency fails to satisfy the criteria.

7. The method of claim 6, wherein the second reselection timer is configured to expire at the expiration time of the first reselection timer.

8. The method of claim 1, further comprising waking up prior to a scheduled wake-up time associated with a subsequent active period when the sleep mode is entered without extending the active period.

9. The method of claim 8, wherein reselection is performed for one or more frequencies, for which a corresponding reselection timer was running when the sleep mode was entered, based at least in part on a determination that a serving cell frequency fails to satisfy a criteria.

10. A user equipment (UE) for wireless communication, comprising:
a memory; and
one or more processors operatively coupled to the memory, the memory and the one or more processors configured to:
determine that a reselection timer has an expiration time that is to extend an active period of a discontinuous reception (DRX) cycle;
determine, when the reselection timer has the expiration time that is to extend the active period, whether to extend the active period based at least in part on at least one of a a rate at which signal strength of a serving cell is decreasing over time;
extend the active period if it is determined to extend the active period; and
enter a sleep mode without extending the active period if it is determined to not extend the active period.

11. The UE of claim 10, wherein whether to extend the active period is determined further based on a set of serving cell measurements and a duration that the expiration time is to extend the active period.

12. The UE of claim 10, wherein whether to extend the active period is determined further based whether a set of serving cell measurements indicate a decrease in the signal strength of the serving cell over the time.

13. The UE of claim 10, wherein the sleep mode is entered without extending the active period based on a duration that the expiration time is to extend the active period satisfying a threshold.

14. The UE of claim 13, wherein the threshold is determined based at least in part on at least one of a sleep duration of a discontinuous reception (DRX) cycle of the UE or aperiodicity of the DRX cycle.

15. The UE of claim 10, wherein the reselection timer is a first reselection timer, and wherein the UE is further configured to:
determine that a measurement of a first frequency, corresponding to the first reselection timer, fails to satisfy a criteria; and
trigger reselection for a second frequency, prior to expiration of a second reselection timer corresponding to the second frequency, based at least in part on determining that the measurement of the first frequency fails to satisfy the criteria.

16. The UE of claim 15, wherein the second reselection timer is configured to expire at the expiration time of the first reselection timer.

17. The UE of claim 10, wherein the UE is further configured to wake up prior to a scheduled wake-up time associated with a subsequent active period when the sleep mode is entered without extending the active period.

18. The UE of claim 17, wherein reselection is performed for one or more frequencies, for which a corresponding reselection timer was running when the sleep mode was entered, based at least in part on a determination that a serving cell frequency fails to satisfy a criteria.

19. A non-transitory computer-readable medium storing one or more instructions for wireless communication, the one or more instructions comprising:
one or more instructions that, when executed by one or more processors of a user equipment (UE), cause the one or more processors to:
determine that a reselection timer has an expiration time that is to extend an active period of a discontinuous reception (DRX) cycle;
determine, when the reselection timer has the expiration time that is to extend the active period, whether to extend the active period based at least in part on a rate at which signal strength of a serving cell is decreasing over time;
extend the active period if it is determined to extend the active period; and
enter a sleep mode without extending the active period if it is determined to not extend the active period.

20. The non-transitory computer-readable medium of claim 19, wherein whether to extend the active period is determined further based on a set of serving cell measurements and a duration that the expiration time is to extend the active period.

21. The non-transitory computer-readable medium of claim 19, wherein the sleep mode is entered without extending the active period based on a duration that the expiration time is to extend the active period satisfying a threshold.

22. The non-transitory computer-readable medium of claim 19, wherein the reselection timer is a first reselection timer, and wherein the one or more instructions further cause the one or more processors to:
determine that a measurement of a first frequency, corresponding to the first reselection timer, fails to satisfy a criteria; and
trigger reselection for a second frequency, prior to expiration of a second reselection timer corresponding to the second frequency, based at least in part on determining that the measurement of the first frequency fails to satisfy the criteria.

23. An apparatus for wireless communication, comprising:
means for determining that a reselection timer has an expiration time that is to extend an active period of a discontinuous reception (DRX) cycle;
means for determining, when the reselection timer has the expiration time that is to extend the active period, whether to extend the active period based at least in part on a rate at which signal strength of a serving cell is decreasing over time;
means for extending the active period if it is determined to extend the active period; and
means for entering a sleep mode without extending the active period if it is determined to not extend the active period.

24. The apparatus of claim 23, wherein whether to extend the active period is determined further based on a set of serving cell measurements and a duration that the expiration time is to extend the active period.

25. The apparatus of claim 23, wherein the sleep mode is entered without extending the active period based on a duration that the expiration time is to extend the active period satisfying a threshold.

26. The apparatus of claim 23, wherein the reselection timer is a first reselection timer, and wherein the apparatus further comprises:
- means for determining that a measurement of a first frequency, corresponding to the first reselection timer, fails to satisfy a criteria; and
- means for triggering reselection for a second frequency, prior to expiration of a second reselection timer corresponding to the second frequency, based at least in part on determining that the measurement of the first frequency fails to satisfy the criteria.

27. The non-transitory computer-readable medium of claim 22, wherein the second reselection timer is configured to expire at the expiration time of the first reselection timer.

28. The non-transitory computer-readable medium of claim 19, wherein the one or more instructions further cause the one or more processors to:
- wake up prior to a scheduled wake-up time associated with a subsequent active period when the sleep mode is entered without extending the active period.

29. The apparatus of claim 26, wherein the second reselection timer is configured to expire at the expiration time of the first reselection timer.

30. The apparatus of claim 23, further comprising: means for waking up prior to a scheduled wake-up time associated with a subsequent active period when the sleep mode is entered without extending the active period.

* * * * *